(12) United States Patent
Ohtsu et al.

(10) Patent No.: US 7,317,861 B2
(45) Date of Patent: Jan. 8, 2008

(54) METHOD OF PRODUCING POLYMER OPTICAL WAVEGUIDE

(75) Inventors: Shigemi Ohtsu, Ashigarakami-gun (JP); Keishi Shimizu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 269 days.

(21) Appl. No.: 10/930,816

(22) Filed: Sep. 1, 2004

(65) Prior Publication Data
US 2005/0158003 A1 Jul. 21, 2005

(30) Foreign Application Priority Data
Jan. 16, 2004 (JP) ............................. 2004/009428

(51) Int. Cl.
*G02B 6/10* (2006.01)
*G02B 6/00* (2006.01)

(52) U.S. Cl. ..................... 385/132; 264/1.24; 385/129
(58) Field of Classification Search ............... 264/259, 264/299, 300, 1.1, 1.24; 385/132
See application file for complete search history.

(56) References Cited

U.S. PATENT DOCUMENTS 6,355,198 B1 * 3/2002 Kim et al. .................. 264/259

FOREIGN PATENT DOCUMENTS

| JP | 05-066435 | * | 3/1993 |
| JP | 3151364 B2 | | 1/2001 |
| JP | 2002-311273 A | | 10/2002 |

OTHER PUBLICATIONS

George M. Whitesides et al, "The Art of Building Small", Scientific American, pp. 39-47, Sep. 2001.
B. Michel et al, "Printing Meets Lithography: Soft Approaches to High-Resolution Patterning", IBM J. Res. & Dev., vol. 45, No. 5, pp. 697-719, Sep. 2001.

* cited by examiner

*Primary Examiner*—Brian Healy
*Assistant Examiner*—Charlie Peng
(74) *Attorney, Agent, or Firm*—Oliff & Berridge, PLC (57) ABSTRACT

A method of producing a polymer optical waveguide, including: preparing a mold; preparing a lower film base material; introducing a core-forming curable resin into a first through-hole of the mold with which the lower film base material is brought into close contact while sucking the concave portion of the mold from a second through-hole under reduced pressure to introduce the core-forming curable resin into the concave portion of the mold; curing the core-forming curable resin which has been introduced; removing the mold from the lower film base material; providing a clad-forming curable resin layer and an upper film base material, the clad-forming curable resin layer being sandwiched between the lower film base material, on which the core is formed, and the upper film base material; and curing the clad-forming curable resin layer to fix the lower film base material and the upper film base material.

20 Claims, 3 Drawing Sheets

METHOD OF PRODUCING POLYMER OPTICAL WAVEGUIDE

CROSS-REFERENCE TO RELATED APPLICATION

This application claims priority under 35USC 119 from Japanese Patent Application No. 2004-9428, the disclosure of which is incorporated by reference herein.

BACKGROUND OF THE INVENTION

1. Field of the Invention

The present invention relates to a method of producing a polymer optical waveguide, and, particularly, to a polymer optical waveguide having a thin flexible filmy form.

2. Description of the Related Art

Among methods of producing a polymer waveguide, the following methods have been proposed: (1) a method in which a film is impregnated with a monomer, the core part is selectively exposed to light to change the refractive index and the film is then applied (a selective polymerization method), (2) a method in which a core layer and a clad layer are applied, and a clad part is then formed by using reactive ion etching (the RIE method), (3) a type of photolithographic method in which an ultraviolet ray-curable resin obtained by adding a light-sensitive material to a polymer material is used to carry out exposure and developing (a direct exposure method), (4) a method using injection molding and (5) a method in which a core layer and a clad layer are applied, and the core part is then exposed to light to change the refractive index of the core part (a photobleaching method).

However, in the selective polymerization method (1) a problem exists in the application of the film, methods (2) and (3) are expensive because a photolithographic method is entailed and in method (4) a problem exists surrounding the accuracy of a core diameter. Furthermore, method (5) also entails a problem insofar that a sufficient difference cannot be obtained between the refractive indices of the core layer and the clad layer.

At present only methods (2) and (3) are practical methods according to which it is possible to achieve a high level of performance. However, as mentioned above, both of these methods give rise to a problem of costs. Moreover, not one of methods (1) to (5) is appropriate for forming a polymer optical waveguide on a flexible plastic base material covering large area.

Another method of producing a polymer optical waveguide is known in which a polymer precursor material for the core is introduced into a patterned substrate (clad) formed into a groove pattern which is to become a capillary. The polymer precursor material is then cured to form a core layer and a plane substrate (clad) is applied to the surface of the core layer. However, when this method has been used, difficulties have occurred insofar that the polymer precursor material is introduced not only into the capillary groove but also spreads thinly over the entire space between the pattern substrate and the plane substrate. In consequence, when the polymer precursor material applied between both substrates is cured, a thin layer having the same composition as the core layer is formed, resulting in the leaking of light through the thin layer.

As one of the methods for solving this problem, David Heard has proposed a method in which a patterned substrate formed with a groove pattern which is to become a capillary is secured to a plane substrate by using a clamp jig, the contact part between the pattern substrate and the plane substrate is further sealed with a resin and pressure is then reduced. A monomer (diallyl isophthalate) solution is then introduced into the capillary to produce a polymer optical waveguide (see the specification of patent publication No. 3151364). According to this method, by using a monomer in place of a polymer precursor material as the core-forming resin material thereby lowering the viscosity of the filler material, and by introducing the monomer by means of a capillary phenomenon, the monomer is prevented from being introduced into any area other than into the capillary.

However, since according to this method a monomer is used as the core-forming material, a problem arises insofar that when the monomer is polymerized into a polymer, the volume shrinkage factor is substantial and transmission loss of the polymer optical waveguide is magnified. Moreover, this method is so complicated that the patterned substrate needs to be secured to the plane substrate by a clamp and in addition, the contact part has to be sealed with a resin. This process is therefore unsuitable for mass-production, and in consequence no reduction in costs can be expected. Also, it is impossible to apply this method to the production of a polymer optical waveguide using as the clad a film having a thickness of several mm or 1 mm or less.

Also, George M. Whitesides and others, in Harvard University have recently proposed, as one of the soft lithographic methods in new technologies making a nano-structure, a method called a capillary micro-mold. According to this method a master substrate is made using photolithography, the nano-structure of the master substrate is copied exactly onto a mold of a polydimethylsiloxane (PDMS) by taking advantage of the adhesiveness and ready releasability of the PDMS, and a liquid polymer is then introduced into the mold by utilizing a capillary phenomenon and secured. A detailed explanatory report appears in SCIENTIFIC AMERICAN SEPTEMBER 2001 (Nikkei Science, December issue (2001).

Also, Kim Enoch and others in the group of George M. Whitesides at Harvard University disclose a capillary micro-mold method (see U.S. Pat. No. 6,355,198). However, even if the production method described in this patent were applied to the production of a polymer optical waveguide, because the core part of the optical waveguide has a small sectional area, considerable time would be required to form the core part, thus rendering the method unfit for mass-production. There is also another drawback with this method insofar that a change in volume is caused when the monomer solution is polymerized to form a polymer, resulting in a change in the shape of the core and accordingly a substantial loss in transmission.

Moreover, B. Michel and others in the IBM Züfrich Research Center have proposed lithographic technologies having a high level of resolution obtained by using a PDMS. Reports suggest that a resolution of several tens of nm has been obtained. A detailed explanatory report appears in the SEPTEMBER 2001 issue of IBM J. REV. & DEV. (Vol. 45 No. 5).

As mentioned above, soft lithographic technologies using a PDMS and a capillary micro-mold method are nano-technologies on which many countries, in particular the USA, have been focusing.

However, if an optical waveguide were manufactured according to the kind of micro-mold method mentioned above, it would be impossible to make the volume shrinkage factor smaller during curing (and thus reduce transmission loss), and at the same time reduce the viscosity of a filler liquid (monomer or the like) to make introduction easy. Therefore, if priority is to be given to reducing transmission loss, it is not possible to maintain the viscosity of the filler liquid within a certain limit. This results in a low speed of introduction and mass-production can not be expected. Moreover, the aforementioned micro-mold method is based on the premise that a glass or silicon substrate will be used as the substrate and does not take into account the use of the kind of flexible film base material used in this method.

Meanwhile, JP-A No. 2002-311273 discloses a method for producing a polymer optical waveguide by using a mold having low rigidity. According to this method, a second convex mold is made from a first concave mold; a resin is applied to the second concave mold and cured to form a first clad having a concave portion which is to be a core pattern; a resin is applied to the concave portion which is to be a core pattern and after the second convex mold has been peeled off the resin is cured to form a core; and a resin is then further applied and cured to form a second clad. It is however difficult to introduce a core resin into only the concave portion and it is therefore difficult to manufacture a fine core pattern with a high degree of accuracy.

In the meantime, in current integrated circuit (IC) technologies and large scale integration (LSI) technologies, much attention is being focused on the fact that optical wiring is being used, in place of highly densified electric wiring between devices, between boards in devices and within chips, in order to quicken operational speed and to enhance the degree of integration.

As elements used for optical wiring, for example, optical fiber wiring boards have been put to practical use in which optical fibers are wired on a sheet board. However, in the case of optical fibers, the end surfaces of the optical fiber must be abraded and optical connectors for connection purposes are also expensive.

For the above reasons, demands have been made to decrease costs by using a polymer waveguide in place of an optical fiber. Also, it is desired to make a flexible polymer optical waveguide by taking advantage of the characteristics of a film. However, the film must usually be made thin to obtain a flexible waveguide. However, if the film is thin, its handling is difficult and a semiconductor process, a highly accurate processing method, cannot be used.

To cope with this demand, the inventors of the invention have proposed a method of producing a flexible polymer optical waveguide by a very simple method disclosed in JP-A No. 2004-86144 and the like. According to this method a mold is provided with a concave portion corresponding to a core, wherein a mold is brought into close contact with a clad film base material which is to be a lower clad layer, and a core-forming curable resin is introduced into the concave portion of the mold. By mean of this method a polymer optical waveguide can be provided at a very low cost with a reduction in propagation loss even though it is substantially less expensive than conventional methods of producing a polymer optical waveguide. However, this polymer optical waveguide still leaves further room for improvements in the reduction of propagation loss.

SUMMARY OF THE INVENTION

The present invention has been made in view of the above-described circumstances and provides a method of producing at extremely low cost, by a much simplified method, a flexible polymer optical waveguide with a very modest loss in propagation.

A first aspect of the invention is to provide a method of producing a polymer optical waveguide. The method comprises: preparing a mold which is formed of a cured layer of a mold-forming curable resin, has a concave portion corresponding to a convex portion of a core of the optical waveguide and is provided with at least two through-holes at the concave portion; preparing a lower film base material comprising a lower film and a flat lower clad layer disposed on the lower film; introducing a core-forming curable resin into a first through-hole of the mold with which the lower film base material is brought into close contact, while sucking the concave portion of the mold from a second through-hole under reduced pressure to introduce the core-forming curable resin into the concave portion of the mold; curing the core-forming curable resin which has been introduced; removing the mold from the lower film base material; providing a clad-forming curable resin layer and an upper film base material, the clad-forming curable resin layer being sandwiched between the lower film base material, on which the core is formed, and the upper film base material; and curing the clad-forming curable resin layer to fix the lower film base material and the upper film base material.

A second aspect of the invention is to provide a method of producing a polymer optical waveguide. The method comprises: preparing a mold which is formed of a cured layer of a mold-forming curable resin, has a concave portion corresponding to a convex portion of a core of the optical waveguide and is provided with at least two through-holes at the concave portion; preparing a lower film base material comprising a lower film and a flat lower clad layer disposed on the lower film; introducing a core-forming curable resin into a first through-hole of the mold with which the lower film base material is brought into close contact, while sucking the concave portion of the mold from a second through-hole under reduced pressure to introduce the core-forming curable resin into the concave portion of the mold; curing the core-forming curable resin which has been introduced; removing the mold from the lower film base material; providing a clad-forming curable resin layer and a shape retentive member having a releasing layer formed thereon, the clad-forming curable resin layer being sandwiched between the lower film base material, on which the core is formed, and the shape retentive member; curing the clad-forming curable resin layer; and removing the shape retentive member from the clad-forming curable resin layer that has been cured.

A third aspect of the invention is to provide a polymer optical waveguide comprising: a lower film base material having a clad-forming curable resin layer disposed on a surface thereof; an optical waveguide core prepared by introducing a core-forming curable resin onto the clad-forming curable resin layer and curing the core-forming curable resin; an upper film base material disposed to sandwich the optical waveguide core with the lower film base material; and a clad-forming curable resin layer, which has been introduced and cured, disposed between the lower film base material and the upper film base material.

The method of producing a polymer optical waveguide according to the invention involves a much simplified production process, enabling a polymer optical waveguide to be formed easily and makes it possible to manufacture a polymer optical waveguide at a substantially lower costs than conventional methods of producing an polymer optical waveguide. Moreover, since though-holes are formed in the mold to suck the core-forming curable resin exit side under reduced pressure, adhesion between the mold and the film base substrate is improved, and this can prevent the mingling of air cells. Further, since a lower clad layer with a flat surface is formed on the lower film and the core is formed on the lower clad layer, it has become possible to reduce propagation loss substantially (0.1 dB/cm or less).

Accordingly, the polymer optical waveguide produced according to the production method of the invention is a flexible polymer optical waveguide with a substantial reduction in propagation loss, and a high degree of accuracy. Moreover, the polymer optical waveguide can be freely packaged on various devices. In addition, the film base substrate can be selected freely in the invention, an expensive clad film can be avoided and an inexpensive film base substrate may be used, thus making it possible to manufacture at low costs a polymer optical waveguide which has a high degree of heat resistance, a lower level of propagation loss and a high degree of accuracy.

DETAILED DESCRIPTION OF THE INVENTION

Even though a very simple method is used, the present inventors have made it possible to manufacture a polymer optical waveguide with a substantial reduction in propagation loss. Thus has been achieved by improving the flatness of the surface on which a core is formed, based, as mentioned above, on the discovery that the propagation loss of a polymer optical waveguide is largely dependent on the flatness of the surface of the clad film base material which is to be the lower clad layer. Specifically, films which can be used as clad film base materials are not always flat microscopically. For this reason, a clad layer with a flat surface is formed on a film (the lower film which will be explained later) and a core is formed on the clad layer, with the result that a polymer optical waveguide with a substantial reduction in propagation loss (0.1 dB/cm or less) can be obtained.

(Method of Producing a Polymer Optical Waveguide)

First, the first method of producing a polymer optical waveguide will be explained. The first method of producing a polymer optical waveguide according to the invention is carried out by means of the following steps:

(1) preparing a mold which is formed of a cured layer of a mold-forming curable resin, has a concave portion corresponding to a convex portion of a core of the optical waveguide and is provided with at least two through-holes located in the vicinity of one end and the other end of the concave portion (hereinafter, the through-hole in the vicinity of one end of the concave portion may be called a first through-hole, and the through-hole in the vicinity of the other end of the concave portion may be called a second through-hole);

(2) preparing a lower film base material comprising a lower film and a flat lower clad layer disposed on the lower film;

(3) introducing a core-forming curable resin into the through-hole formed in the vicinity of the one end of the concave portion of the mold (a first through-hole) with which the lower film base material is brought into close contact, while sucking the concave portion of the mold from the through-hole positioned in the vicinity of the other end of the concave portion of the mold (a second through-hole) under reduced pressure to introduce the core-forming curable resin into the concave portion of the mold;

(4) curing the core-forming curable resin which has been introduced;

(5) removing the mold from the lower film base material;

(6) providing a clad-forming curable resin layer and an upper film base material, the clad-forming curable resin layer being sandwiched between the lower film base material, on which the core is formed, and the upper film base material; and (7) curing the clad-forming curable resin layer to fix the lower film base material and the upper film base material.

According to the first method, the use of a film capable of performing the function of a clad as either the lower film or the upper film makes it possible to reduce the thickness of the lower clad layer or, in the step of (7), the thickness of the clad-forming curable resin layer.

The second production method of the invention is the same as the first production method except insofar that the upper clad layer is constituted only of a cured layer of a clad-forming curable resin, and that a shape retentive member provided with a releasing layer on its surface is placed on the resin layer being cured when the clad-forming curable resin layer is cured. In a case when no upper film base material is formed, the use of a shape retentive member provided in this manner prevents deformation, such as warpage, of the polymer optical waveguide produced. Except in respect of the modifications described above, the second production method has production steps identical to those of the first production method. In the second production method, the step of removing the shape retentive member from the clad-forming curable resin layer that has been cured can be called as step (8).

The method of producing a polymer optical waveguide according to the invention is based on the discovery that when, as mentioned above, a clad flexible film base material highly adhesive to the mold is brought into close contact with the mold, even when the mold and the film base material are not secured to each other by a specific means (the securing means as described in the specification of the above U.S. Pat. No. 3,151,364) no gap other than the concave structure formed in the mold is formed between the mold and the clad base material, and the core forming curable resin can thus be made to penetrate into only the concave portion. The method of producing a polymer optical waveguide according to the invention thus involves a very simplified production process, enabling a polymer optical waveguide to be formed easily. By using this method it has now become possible to manufacture a polymer optical waveguide at substantially lower costs than with conventional methods of producing an polymer optical waveguide. Also, since in the method of producing a polymer optical waveguide according to the invention though-holes are formed in the mold to suck the core-forming curable resin exit side under reduced pressure, adhesion between the mold and the film base substrate is improved and mingling of air cell can thus be prevented. The method of producing a polymer optical waveguide according to the invention thus makes it possible to obtain a flexible polymer optical waveguide with a significant reduction in propagation loss, a flexible polymer optical waveguide which has high degree of accuracy and which, moreover, can be freely packaged on various devices at low costs. Further, aspects such as the shape of the polymer optical waveguide can be freely designed. Moreover, In the first and second methods of producing a polymer optical waveguide according to the invention, a core is produced after the lower clad layer with a flat surface is formed on the lower film. Propagation loss is therefore significantly diminished, compared to a case where the lower clad is constituted by using only a clad film.

When a flexible polymer waveguide (film-shaped polymer optical waveguide) is manufactured, the thickness of the entire polymer optical waveguide is preferably 300 μm or less. According to the production method of the invention, it becomes possible for a polymer optical waveguide having a thickness of 300 μm or less to be produced by means of a very simple method.

The method of producing a polymer optical waveguide according to the invention will be hereinafter explained in order of steps.

(1) Preparing a mold which is formed of a cured layer of a mold-forming curable resin, has a concave portion corresponding to a convex portion of a core of the optical waveguide and is provided with at least two through-holes in the vicinity of one end and in the vicinity of other end of the concave portion The mold is preferably produced using a master plate formed with a convex portion corresponding to the optical waveguide core, though the method of producing the mold is not limited to this method. Hereinafter, the method using the master plate will be explained.

<Production of a Master Plate>

In the production of the master plate formed with a convex portion corresponding to the optical waveguide core, conventional methods, for example, a photolithographic method may be used without any particular limitation. Also, the method disclosed in JP-A No. 2002-333538 for producing a polymer optical wave guide by an electrodeposition method, or by an optical electrodeposition method, may also be applied to produce the master plate. The size of the convex portion corresponding to the optical waveguide to be formed on the master plate can be appropriately determined, depending on matters such as the use to which the polymer optical waveguide will be applied. In the case of, for example, a single-mode optical waveguide, a core of about 10 μm by 10 μm square is used, and in the case of, for example, a multi-mode optical waveguide, a core of about 50 to 100 μm by 50 to 100 μm square is normally used. An optical waveguide with an even larger core part, of a size of around several hundreds μm, can be utilized, depending on use.

<Production of a Mold>

One example of a method of producing a mold is a method in which a layer of a mold-forming curable resin is applied to, or cast onto the convex portion-formed surface of the master plate produced in the above manner, thus form a layer of the mold-forming curable resin. The layer is then subjected to drying treatment as required, followed by curing treatment. Thereafter, the cured resin layer is peeled from the master plate to make a mold having a concave portion corresponding to the convex portion, and through-holes are formed in the mold in the vicinity of one end and the other end of the concave portion. The through-holes may be formed by punching the mold with a predetermined shape. Even in the case of the through-holes being punched, adhesion between the mold and the clad film base material is so firm that no gap, other than the concave portion of the mold, is formed between the mold and the clad film base material, with the result that the core-forming curable resin never penetrates anywhere other than the concave portion.

The thickness of the mold (resin cured layer) is preferably about 0.1 to 50 mm, but this can be decided as appropriate, taking into due consideration of handling characteristics required for the mold.

It is also desirable that, in order to promote peeling (removing) from the mold, the master plate be subjected in advance to releasing treatment such as the application of a releasing agent.

The through-hole disposed on the side from which the core-forming curable resin is introduced may have a function as a liquid (core-forming curable resin) trap. Further, the through-hole disposed on the side from which the core-forming curable resin is discharged is used for vacuum suction for the purpose of reducing pressure in the concave portion of the mold. No particular limitation is imposed on the shape and size of the through-hole on the introduction side, as long as the through-hole is linked with the introduction end of the concave portion. Moreover, no particular limitation is imposed on the shape or the size of the through-hole on the discharge side, as long as the through-hole is linked with the discharge end of the concave portion and can be used for the purpose of vacuum suction.

Since the through-holes disposed on the side from which the core-forming curable resin is introduced perform a function as a liquid trap, if, when the mold is brought into close contact with the clad film base material, the sectional area of the trap is large at the side in contact with the base material, and is made so as to decrease commensurate with its distance from the base material, after the core-forming curable resin has been introduced into the concave portion and cured, the base material is easily peeled from the mold. Since it is unnecessary for the through-holes on the core-forming curable resin discharge side to perform a function as a liquid trap, it is unnecessary to adopt the same kind of sectional structure.

Other examples of production of the mold include a method in which not only the convex portion corresponding to the core of the optical waveguide but also the convex portion for forming the through-holes (the height of this convex portion is made to be greater than the thickness of the cured layer of the mold-forming curable resin) is formed in the master plate. The mold-forming curable resin is then, for example, applied to the master plate such that the convex portion for forming the though-holes penetrates through the resin layer. The cured resin layer is then cured and thereafter peeled (removed) from the master plate.

The mold-forming curable resin used to manufacture the mold preferably makes it possible to obtain a cured product which can be easily peeled from the master plate, as a (repeatedly used) mold maintains a mechanical strength/dimensional stability greater than a predetermined level, retains a hardness sufficient to maintain a concave shape and exhibits a high level adhesion to the clad film base material. It is possible to add various additives to the mold-forming curable resin.

The mold-forming curable resin can be applied to or cast onto the surface of the master plate. Because it is necessary to copy exactly the convex portions corresponding to the individual cores of the optical waveguide, the mold-forming curable resin preferably has a viscosity lower than a certain limit, for example, about 500 to 7000 mPa·s. (It should be noted that a "mold-forming curable resin" includes resins made into elastic rubber-like bodies after curing.) Moreover, a solvent for regulating a level of viscosity may be added, to an extent that the solvent does not exert an adverse influence.

As the mold-forming curable resin, from the viewpoint of elasticity, mechanical strength/dimensional stability, hardness and adhesion to the clad base material, as mentioned above, a curable organopolysiloxane which is made into silicone rubber (silicone elastmer) or a silicone resin is preferably used. The curable organopolysiloxane is preferably one containing a methylsiloxane group, an ethylsiloxane group or a phenylsiloxane group in its molecules. The curable organopolysiloxane may also be either a one-liquid type, or a two-liquid type used in combination with a curing agent. The curable organopolysiloxane may be a thermosetting type or an ambient-temperature-curable type (e.g., of a type which is cured by moisture in the air), or it may be a curable organopolysiloxane which takes advantage of other curing phenomena (e.g., of an ultraviolet ray-curable type).

The curable organopolysiloxane is preferably one which is made into silicone rubbers after curing. Among these siloxanes, those generically called liquid silicone rubbers can be used (in this context "liquid" includes materials having a high viscosity such as paste-like materials). Two-liquid types used in combination with a curing agent are preferable. Among such types, addition-type liquid silicon rubbers are preferable because they are cured in such a way that the surface and insides thereof are uniformly cured within a short period of time, produce no, or a in the process few byproducts; and they also have a high degree of releasability and a modest shrinkage factor.

Among the liquid silicone rubbers mentioned above, liquid dimethylsiloxane rubbers are particularly preferable in terms of adhesion, releasability, strength and hardness. Further, the cured product of the liquid dimethylsiloxane rubber usually has a refractive index as low as about 1.43 and a mold made from the cured product can therefore be utilized as the clad layer as it stands without releasing it from the clad base material. In these circumstances, steps are needed to be taken to prevent the introduced core-forming resin from being peeled from the clad base material.

The viscosity of the liquid silicone rubber is preferably about 500 to 7000 mPa·s and more preferably about 2000 to 5000 mPa·s from the viewpoint of copying the convex portion corresponding to the core of the optical waveguide exactly, reducing the mingling of air cells to make it easy to defoam and from the viewpoint of forming a mold having a thickness of several mm.

The surface energy of the mold is preferably in a range of 10 dyn/cm to 30 dyn/cm, and more preferably 15 dyn/cm to 24 dyn/cm from the viewpoint of adhesion to the base material film.

In terms of moldability, maintaining the shape of the concave portion and releasability the share rubber hardness of the mold is preferably 15 to 80 and more preferably 20 to 60.

The surface roughness (root-mean-square roughness) (RMS) of the mold is 0.2 μm or less and preferably 0.1 μm (100 nm) or less in view of moldability.

Moreover, the mold preferably transmits light in the ultraviolet region and/or in the visible region. The reasons why the mold preferably transmits light in the visible region is that when the mold is brought into contact with the clad film base material in the following step (2), both can be aligned, and it can be observed whether for example in step (3) the core-forming curable resin is being introduced into the concave portion of the mold and thus can confirm, easily whether the process of introducing the resin has been completed. Moreover, the reason why the mold preferably transmits light in the ultraviolet region is that when an ultraviolet ray-curable resin is used as the core-forming curable resin, ultraviolet curing is carried out through the mold and the transmittance of the mold in the ultraviolet region (250 nm to 400 nm) is 80% or more.

The above-described curable organopolysiloxane and particularly, the liquid silicone rubber which becomes silicone rubber after curing is superior in terms of what are contradictory characteristics, namely adhesion to and releasability from the clad film base material. The curable organopolysiloxane, and in particular the liquid silicone rubber, also has the ability to copy a nanostructure and can prevent even the penetration of a liquid when the silicone rubber is brought into close contact with the clad base material. The mold using such silicone rubber copies the master plate with a high degree of accuracy and because it is in close contact with the clad base material, it becomes possible to introduce the core-forming resin efficiently into only the concave portion between the mold and the clad base material. Moreover, it is also easy to peel the clad base material from the mold. In consequence, it is possible to manufacture extremely easily from the mold a polymer optical waveguide which keeps its shape to a high level of accuracy.

(2) Preparing a lower film base material comprising a lower film and a flat lower clad layer disposed on the lower film;

In this step, a lower clad layer having a flat surface is provided on a lower film so that the surface on which a core is formed is made flat. In this context, a "flat surface" means that the surface smoothness measured by a tracer is 1/200 to 1/10 of the wavelength of the light used for the polymer optical waveguide. The surface smoothness measured by a tracer is preferably 1/200 to 1/20 of the wavelength of the light used for the polymer optical waveguide.

As the lower film, any film may be used, including those which perform a function as a clad and those which do not perform a function as a clad. Also, circumstances exist where heat resistance is demanded of the polymer optical waveguide. In such a case, it is preferable to use a lower film constituted of a heat resistant resin film. Moreover, to prevent water from causing a change in a refractive index, and deterioration in terms of propagation loss in the infrared region, as the lower film, it is preferable to use a resin with a low water-absorptive capacity.

Also, in order to form a flat lower clad layer, it is preferable to form a layer which has a flat surface and is made of a clad-forming curable resin, and then cure this layer to form a lower clad layer. Examples of methods of producing such a layer with a flat surface include (1) a method in which a clad-forming curable resin is applied to the lower film by a method such as a spin coating method, or a dip coating method, (2) a method in which after the resin is applied according to the above method, a shape retentive member with a flat surface (with a releasing layer formed on the surface in contact with the layer) is placed on the coated surface, (3) a method in which, according to the above method (2), a gap-forming member is used to control the thickness of the layer of the clad-forming curable resin and (4) a method in which a fixed gap is formed between the lower film and the shape retentive member by using the gap-forming member and the clad-forming curable resin is injected into the gap by utilizing a capillary phenomenon or the like.

In the above methods (2) to (4), after the clad-forming curable resin layer has been cured, the shape retentive member is peeled off. Since the releasing layer is provided on the surface of the shape retentive member, the shape retentive member can be easily peeled from the cured layer.

In cases where the shape retentive member is used according to the above method (the above methods (2) to (4)), a lower clad base material free from deformation such as warpage is not only obtained but also the handling of the extremely thin lower film base material is made easy. Also, in circumstances where the gap-forming member is used according to the above method (the above methods (3) and (4)), a lower clad layer with a uniform film thickness can be formed.

The thickness of the lower clad layer may be optionally decided depending on whether or not the lower film performs a function as a clad. When the lower film performs a function as a clad, the thickness may be generally 0.1 to 30 μm and preferably about 1 to 20 μm. Also, when the lower film does not perform a function as a clad, the thickness of the lower clad layer is preferably about 10 to 100 μm, and more preferably about 20 to 50 μm.

Materials for a lower film having a clad function may be selected on the basis of the use to which the polymer optical waveguide is applied, taking into consideration optical characteristics such as refractive index and light-transmittance, and other factors such as mechanical strength, heat resistance, adhesion to the mold and flexibility. Examples of materials used as the film include an alicyclic acryl resin film, an alicyclic olefin resin film, a cellulose triacetate film and a fluorine-containing film. In order to secure a difference in the refractive indices of the core and the film base material, the refractive index of the film base material is preferably 1.55 or less, and more preferably 1.53 or less.

As the aliphatic acryl resin film, for example, OZ-1000 and OZ-1100 (manufactured by Hitachi Chemical Co., Ltd.)

prepared by introducing an aliphatic cyclic hydrocarbon such as tricyclodecane into an ester substituent are used.

Examples of an aliphatic olefin resin film include those having a norbornane structure in the principal chain thereof, and those having a norbornane structure in the principal chain thereof and in a side chain thereof a polar group such as an alkyloxycarbonyl group (alkyl groups having 1 to 6 carbon atoms or a cycloalkyl group). Among these compounds, as mentioned above, alicyclic olefin resins having a norbornane structure in the principal chain thereof, and a polar group such as an alkyloxycarbonyl group in a side chain thereof, have excellent optical characteristics such as a low refractive index (a refractive index close to 1.50, ensuring a difference in the refractive indices of the core and the clad) and a high level of light transmittance. Alicyclic olefin resins are also superior in terms of adhesion to the mold and in heat resistance, and are therefore particularly suitable for the production of the optical waveguide of the invention.

As a lower film which does not perform a clad function, films having a high refractive index such as a polyether sulfone, a polyether ketone and a polyimide may also be used.

Further, the thickness of the lower film is selected as appropriate, taking into consideration factors such as flexibility, rigidity and ease of handling. In the case of a flexible film-like polymer optical waveguide, a thickness of about 0.1 mm to 0.5 mm is normally preferable.

As the clad-forming curable resin, ultraviolet ray-curable resins and thermosetting resins are preferably used. For example, ultraviolet ray-curable or thermosetting monomers, oligomers, or mixtures of monomers and oligomers are used. Also, in order to be able to form a thickness of the layer uniformly, the viscosity of the above clad-forming curable resin is preferably about 2,000 mPa·s or less, and more preferably about 10 mPa·s to about 2,000 mPa·s.

A change in the volume (cured shrinkage factor) of the clad-forming curable resin after the resin has been cured is preferably 10% or less and more preferably 6% or less. In order to curb the degree of volumetric change, a polymer (a methacrylic acid or epoxy type) which is compatible with the resin, and which does not adversely affect the refractive index, the elastic modulus or the transmission characteristics of the resin, may be added to the resin.

(3) Introducing a core-forming curable resin into a first through-hole of the mold with which the lower film base material is brought into close contact, while sucking the concave portion of the mold from a second through-hole under reduced pressure to introduce the core-forming curable resin into the concave portion of the mold In this step, the mold is brought into close contact with the lower film base material, core-forming curable resin is introduced in the through-hole positioned at the resin introduction side, resin is also sucked under reduced pressure from the through-hole disposed on the resin discharge side to introduce the resin into a gap (the concave portion of the mold) formed between the mold and the lower film base material. The sucking under reduced pressure can enhance adhesion between the mold and the lower film base material, whereby air cells can be prevented from becoming mingled. The sucking under reduced pressure is carried out, for example, by inserting a sucking tube into the though-hole disposed on the discharge side, and thus connecting the sucking tube with a pump.

As the core-forming curable resin, resins such as radiation-curable, electron ray-curable or thermosetting resins may be used. Among these resins, ultraviolet ray-curable resins and thermosetting resins are preferably used.

As the ultraviolet ray-curable resin or thermosetting resin for forming the above core, ultraviolet ray-curable or thermosetting monomers, oligomers or mixtures of monomers and oligomers are preferably used.

Also, as the ultraviolet ray-curable resin, an epoxy type, a polyimide type or an acryl type ultraviolet ray-curable resin is preferably used.

The core-forming curable resin is introduced into the gap (the concave portion of the mold) formed by a capillary phenomenon between the mold and the lower film base material. The core-forming curable resin therefore preferably has a viscosity low enough to ensure that the core-forming curable resin can be introduced. The viscosity of the curable resin is therefore preferably 10 mPa·s to 2,000 mPa·s, more preferably 20 mPa·s to 1,000 mPa·s, and still more preferably 30 mPa·s to 500 mPa·s.

In addition, a change in the volume of the curable resin before and after the resin is cured must be small enough to reproduce to a high degree of accuracy the original shape of the concave portion corresponding to the core of the optical waveguide formed on the master plate. For example, a reduction in the volume can become a cause of a propagation loss. Therefore, the core-forming curable resin is preferably one reduced in volumetric change to the maximum extent possible. Resins having a volumetric change of 10% or less and preferably 6% or less are desirable. Whenever possible, it is preferable to avoid using a solvent to make the resin less viscous, because this brings about a significant change in volume before and after the resin is cured.

In order to minimize a change in volume (shrinkage) of the core-forming curable resin when the resin is cured, a polymer may be added to the resin. Preferable as such a polymer are those which are compatible with the resin and which do not adversely affect the refractive index, elastic modulus and transmitting characteristics of the resin. Further, the addition of the polymer not only minimizes volumetric change but also controls to a high degree of accuracy the viscosity and the grass transition temperature of the cured resin. As the polymer, an acryl type, a methacryl type and an epoxy type can be used, but the invention is not limited to these types.

The refractive index of the cured product of the core-forming curable resin must be higher than that of the clad (e.g., the lower clad layer and the cured product of the clad-forming curable resin in the above step (6)) and is 1.50 or more and preferably 1.53 or more. A difference in refractive index between the clad (including the clad layer in the following step (5)) and the core is 0.01 or more.

(4) Curing the core-forming curable resin which has been introduced, and (5) removing the mold from the lower film base material In these steps, the core-forming curable resin introduced is cured and then the mold is removed (peeled) from the lower film base material. An ultraviolet (UV) lamp, an ultraviolet light-emitting diode (LED) or an ultraviolet radiator is used to cure an ultraviolet ray-curable resin, and to cure a thermosetting resin, a process such as heating in an oven can be used.

(6) Providing a clad-forming curable resin layer and an upper film base material, the clad-forming curable resin layer being sandwiched between the lower film base material, on which the core is formed, and the upper film base material Examples of a method of providing a clad-forming curable resin layer between the core-formed surface of the lower film base material and the upper film base material include (1) a method in which the clad-forming curable resin is applied to the surface on which the core is formed by a spin coating method or a dip coating method, and the upper film substrate material is then placed on the resin, (2) a method in which, in the above method (1), a gap-forming member is used to control the thickness of the clad-forming curable resin layer, (3) a method in which a gap-forming member is used to form a predetermined gap between the lower film base material and the upper film base material, and the clad-forming curable resin is then injected into this gap by a capillary phenomenon.

Moreover, in the above methods (1) to (4), the shape retentive member is placed on the upper film base substrate, which not only allows the film base material to be easily handled during subsequent steps (the thin film-like material is easily handled) but also prevents deformation of the polymer optical waveguide which is eventually obtained, particularly a film-like polymer optical waveguide (because the upper film base material is formed on the cured layer of the clad-forming curable resin, the waveguide is more resistant to deformation than in a case where no upper film base material is used; but the deformation is even more restricted when the shape retentive member is used). The shape retentive member is preferably provided with a releasing layer on a surface which is in contact with the upper film base material (even if the clad-forming curable resin bulges out and sticks to the shape retentive member, it can be easily peeled off.

In the above method, there is no particular limitation on the place where the gap-forming member is disposed.

As the material for the clad-forming curable resin, the same resins as are used for the lower clad layer can be used.

The thickness of the cured layer of the clad-forming curable resin may be determined as appropriate depending on whether or not the upper film base material performs a clad function. When the upper film base material performs a clad function, the thickness is preferably about 0.1 to 30 µm, and more preferably about 1 to 20 µm. When the upper film base material does not perform a clad function, the thickness of the cured layer is generally about 10 to 100 µm and preferably about 20 to 50 µm.

As the material for the upper film base material, any material which performs a function, or does not perform function as a clad, may be used, and the same materials as used for the lower film can be used.

In the polymer optical waveguide of the invention, a difference in refractive indices between the lower clad and the upper clad is preferably restricted to the smaller end of the scale, and from the viewpoint of confinement of light, is preferably within 0.05, more preferably within 0.001 and still more preferably completely eliminated.

The shape retentive member which can be used in the above steps (2) and (6), and which can either have a releasing layer or not is used to prevent the deformation of the polymer optical waveguide which is a final product and to allow the thin film-like material to be handled easily. It is therefore preferable to use a material which has a high degree of rigidity and can be deformed only to a minor degree, for example, glass, metals and plastic materials. When a plastic material is used, the material preferably has adequate thickness. The thickness of the shape retentive member is preferably 150 µm or more, and a maximum thickness is in a range of several centimeters.

As for the shape and size of the shape retentive member, a shape retentive member having the same shape and a size equal to, or one size larger than, that of the upper film base material is used. Moreover, it is preferable to use a light-transmittable shape retentive member so that materials thereunder can be observed through it. Further, in circumstances where the clad-forming curable resin is cured by irradiation with ultraviolet rays through the shape retentive member, the shape retentive member must be ultraviolet ray-transmittable.

As a releasing material used for the releasing layer, fluororesins such as an amorphous fluororesin are preferably used. For example, materials such as SAITOP manufactured by Asahi Glass Co., Ltd are preferable because they can be applied uniformly.

Also, for the gap-forming member (spacer) which can be used in the above steps (2) or (6), materials with a high degree of rigidity, such as metals and glass, and for example, strip films or strip sheets made of stainless steel can be used. The use of the gap-forming member facilitates formation of a clad-forming curable resin layer of a designated thickness. The gap-forming member may be positioned anywhere as long as the thickness of the layer of the clad-forming curable resin can be limited. The thickness of the gap-forming member can be selected as appropriate, depending on the thickness of the polymer optical waveguide, the thickness of the film to be used, the thickness of the clad-forming curable resin and the place where it is disposed.

(7) Curing the clad-forming curable resin layer to fix the lower film base material and the upper film base material This layer is cured by a means appropriate to the type of clad-forming curable resin, and the lower film base material is applied to the upper film base material.

Also, in the above steps (2) to (7), it is preferable for each step to be carried out with a fixing jig having a smooth surface and a high degree of rigidity placed under the lower film or under the upper film base material. This is because a thin film-like material is easily handled and the thickness of the film can be easily controlled.

After the step mentioned above has been completed, both ends of the polymer optical waveguide produced are preferably cut by a dicer to form a mirror surface.

A second method of producing a polymer optical waveguide according to the invention is the same as the aforementioned first method except insofar that the upper clad layer is constituted only of a cured layer of a clad-forming curable resin and that the shape retentive member provided with a releasing layer on a surface thereof is placed on the clad-forming curable resin layer when the clad-forming curable resin layer is cured. In the second production method, the step of removing the shape retentive member from the clad-forming curable resin layer that has been cured can be called as step (8).

Examples of methods of providing the clad-forming curable resin layer on the surface of the lower clad base material, on which surface the core is to be formed, include a method in which the clad-forming curable resin is applied by a spin coating method to the surface on which the core is to be formed, and a method in which a gap-forming member is used to form a predetermined space between the surface on which the core is to be formed and the shape retentive member, and the clad-forming curable resin is then injected into the space between the two.

According to the first and second methods of producing a polymer optical waveguide, a flexible polymer optical waveguide is manufactured. Although, by selecting as appropriate a thickness of each of the lower film base material, the upper film base material and the cured layer of the clad-forming curable resin, the polymer optical waveguide assumes a filmy form or a sheet-like form, when the thickness of the polymer optical waveguide is designed to be 300 µm or less, a highly flexible film-shaped polymer optical waveguide can be obtained and the scope of the range of applications becomes extremely wide.

Next, one example of the first method of producing a polymer optical waveguide according to the invention will be explained with reference to drawings.

First, steps (1) to (5) will be explained with reference to FIGS. 1A to 1F.

Figure 1A:
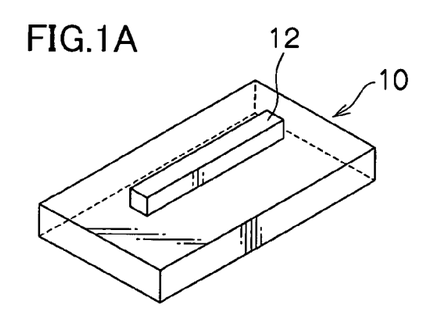
FIGS. 1A to 1F are conceptional views showing steps (1) to (5) in a first and a second method of producing a polymer optical waveguide according to the present invention.
Figure 1B:
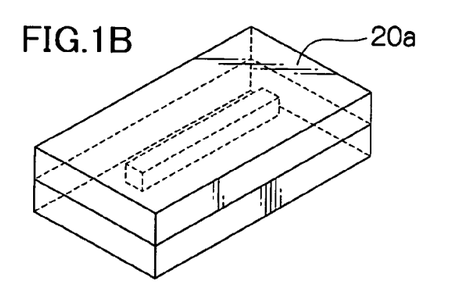
Figure 1C:
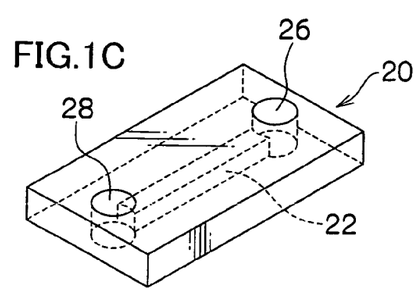

FIG. 1A illustrates a master plate 10, and 12 is a convex portion corresponding to an optical waveguide core. A mold-forming curable resin is applied to or cast onto the surface of the master plate 10, on which surface the convex portion is formed, and the mold-forming curable resin is then cured (see FIG. 1B). In FIG. 1B, 20a indicates a cured resin layer. When, thereafter, the cured resin layer 20a is peeled off, a cured resin layer 20a formed with a concave portion is obtained (not shown). Through-holes 26 and 28 linked to the concave portion 22 are formed by a process such as punching at both ends of the concave portion of the cured resin layer 20a on which the concave portion 22 has been formed. A mold 20 is thus obtained (see FIG. 1C).

Figure 1D:
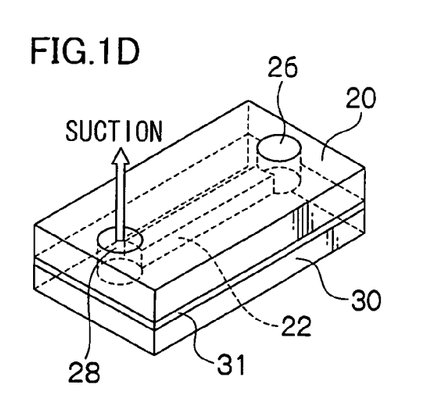
Figure 1E:
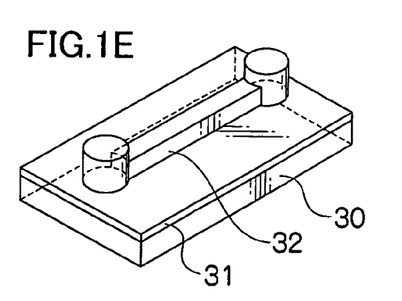
Figure 1F:
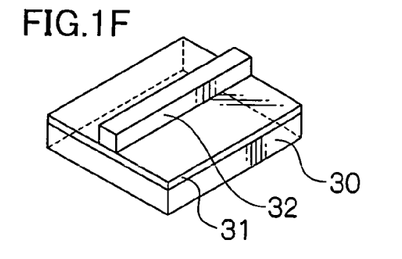

Next, as shown in FIG. 1D, a lower film base material is brought into contact with the mold. The lower film base material is provided with a lower film 30 and a lower clad layer 31, and the lower clad layer 31 is brought into close contact with the mold. Thereafter, a core-forming curable resin is introduced into the through-hole 26 formed in the mold and the resin is sucked under reduced pressure from the through-hole 28 formed at the other end to introduce the core-forming curable resin into the concave portion 22 of the mold. When the resin has been then cured and the mold has been peeled off, an optical waveguide core 32 is formed on the lower clad layer 31, as shown in FIG. 1E. Finally, the resin part cured in the through-holes 26 and 28 is cut off by a dicer or the like.

Figure 2A:
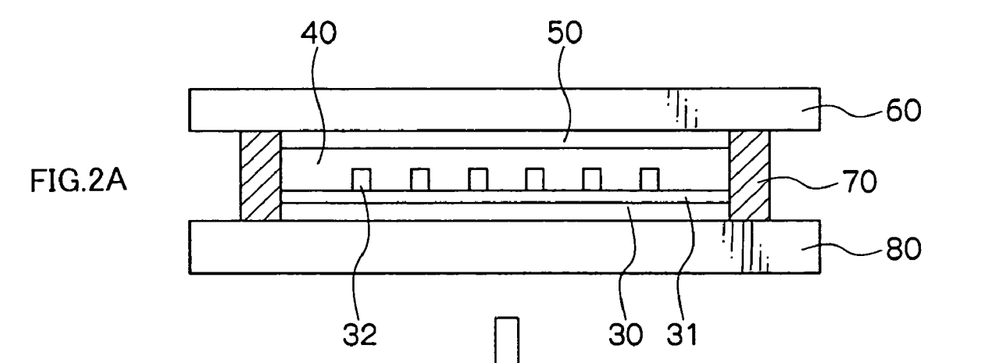
FIGS. 2A and 2B are conceptional views illustrating steps (6) and (7) in a first method according to the invention.

Next, step (6) described above is shown in FIGS. 2A and 2B. In FIG. 2A, 30 indicates the lower film, 31 indicates the lower clad layer, 32 indicates the core, 40 indicates a clad-forming curable resin layer and 50 indicates an upper film base material. Further, 60 indicates a shape retentive member having on its surface a releasing layer (not shown), 70 indicates a gap-forming member and 80 indicates a fixing jig. The gap-forming member may be disposed either between the fixing jig 80 and the shape retentive member 60, or between the upper film base material 50 and the fixing jig 80.

Figure 2B:
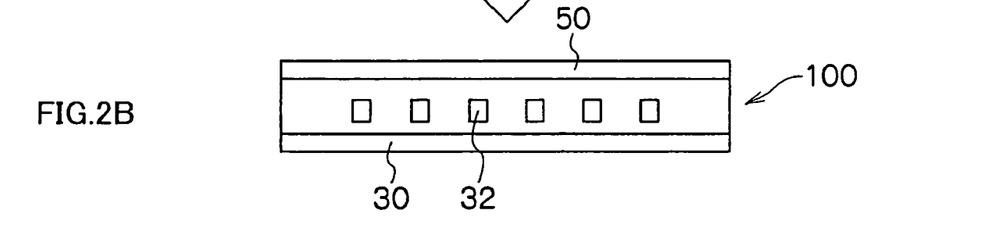

In this condition, the clad-forming curable resin is cured to form the upper clad layer. When, thereafter, the shape retentive member is peeled from the upper film base material, a polymer optical waveguide 100 is obtained (FIG. 2B). The polymer optical waveguide 100 has the core 32 embedded in the cured layer (40+31) of the clad-forming curable resin and has a structure in which the cured layer is sandwiched between the lower film 30 and the upper film base material 50.

Figure 3A:
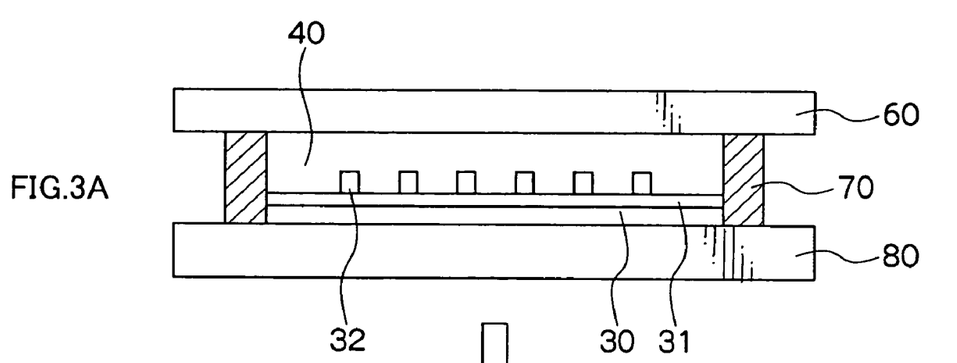
FIGS. 3A and 3B are conceptional views illustrating steps (6) to (8) in a second method according to the invention.
Figure 3B:
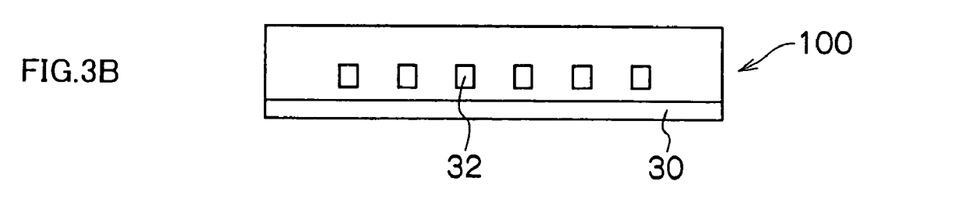

Further, FIGS. 3A and 3B illustrate step (6) in the second production method of the invention. In FIG. 3A, parts represented by the same symbols as those in FIG. 2A indicate the same parts. The second production method differs from the first production method insofar that an upper film base material is not used and the clad-forming curable resin layer is formed of an even greater thickness.

The clad-forming curable resin is cured in this condition. When thereafter, the shape retentive member 60 is peeled from the cured layer, the polymer optical waveguide 100 is obtained (FIG. 3B).

In the method of producing a polymer optical waveguide according to the invention, particularly, a liquid silicone rubber which is cured into a rubber-like material, and more particularly a liquid dimethylsiloxane rubber, is used as the mold-forming curable resin, and an alicyclic olefin resin having a norbornane structure as its primary chain, and a polar group such as an alkyloxycarbonyl group as a side chain is used as the clad film base material. This combination provides particularly high adhesion between the mold-forming curable resin and the clad film base material, and prevents deformation of the structure of the concave portion of the mold; and even when the sectional area of the structure of the concave portion is very small (e.g., 10×10 µm rectangle) a curable resin can be introduced rapidly into the concave portion by a capillary phenomenon.

EXAMPLES

The present invention will hereinafter be explained in more detail by way of examples, which, however, are not intended to be limiting of the invention.

Example 1

A thick film resist (SU-8, manufactured by MicroChem Corp.) is applied to a silicon (Si) substrate by a spin coating method, prebaked at 80° C., exposed to light through a photomask and developed to form 8 convex portions each having a square section (width: 50 µm, height: 50 µm and length: 80 mm). Intervals between the convex portions are designed to be 250 µm. Next, the substrate is post-baked at 120° C. to manufacture a master plate for manufacturing a polymer optical waveguide.

Next, a releasing agent is applied to the master plate, into which a mixture of a thermosetting liquid dimethylsiloxane rubber (SYLGARD 184, manufactured by Dow Coning Asia, viscosity: 5000 mPa·s) and a curing agent are introduced and heated at 120° C. for 30 minutes and then cured. The cured layer is then peeled off to manufacture a mold (thickness of the mold: 5 mm) having a concave portion and corresponding to the aforementioned rectangular convex portion.

Moreover, through-holes each having a circular plane shape and a taper-like shape in section along a direction of the thickness of the mold are formed by punching in the vicinity of one end and the other end of the concave portion in such a way that each through-hole is linked to the convex portion to form a mold. The through-hole on the side from which the core-forming curable resin is introduced into the mold is made to have a diameter of 4 mm on the side of the mold, which side is in contact with a clad film base material, and a diameter of 3.5 mm on the opposite side of the mold.

The mold has a surface energy of 22 dyn/cm, a shear rubber hardness of 60, a surface roughness of 10 nm or less and an ultraviolet ray-transmittance of 80% or more, and moreover is so transparent that underlying materials can be well observed.

Next, a polyether sulfone (PES) film (lower film) having a film thickness of 100 µm is irradiated with excimer light (light intensity: 10 mW/cm²) having a wavelength of 172 nm to carry out surface treatment. The treated lower film is placed on a fixing jig made of glass and a clad ultraviolet ray-curable resin (refractive index: 1.51) is applied to the treated surface by a spin coating method. After that, the resin is irradiated with ultraviolet rays to cure the resin, to thereby manufacture a lower film base material formed with a lower clad layer having a film thickness of 22 µm. (The following steps are all carried out on the above-mentioned fixing jig.)

Next, the surface of the mold on which surface the concave portion is formed is brought into close contact with the lower clad layer of the lower film base material. Then, an amount of a few droplets of an ultraviolet ray-curable resin having a viscosity of 600 mPa·s is dropped onto the through-hole on the side of the mold into which side the resin is introduced, and resin is sucked under reduced pressure from the discharge side (vacuum sucking side through-hole), with the result that the ultraviolet ray-curable resin is introduced into the concave portion within 10 minutes. Then, UV light is applied from above the mold at an intensity of 50 mW/cm² for a period of 10 minutes to cure the ultraviolet ray-curable resin. When the mold is peeled from the PES film, a core having the same shape as the convex portion of the master plate is formed. The refractive index of the core is 1.55.

Next, a clad ultraviolet ray-curable resin of the same material as that used to form the lower clad layer is applied by means of a dispenser to the surface of the lower film base material on which surface the core is formed. (Coating thickness is designed in such a way that when the PES film is placed on the surface of the clad ultraviolet ray-curable resin and a glass plate is placed on a spacer, it is a thickness which prevents any gap occurring between the PES film and the glass plate.)

The PES film which has a film thickness of 100 µm and has been surface-treated by excimer light is placed on the coating surface of the clad ultraviolet ray-curable resin. Next, a metal spacer (gap-forming member) 300 µm in thickness is put on the surface of a fixing jig and a glass plate (shape retentive member) coated with 0.2-µm-thick Saitop (fluororesin manufactured by Asahi Glass Company) is put on the spacer. 50 mW/cm$^2$ UV light is applied to the resin through the glass plate for a period of 10 minutes to cure the resin. A flexible film-shaped polymer optical waveguide having a total thickness of 300 µm is thus obtained.

Next, by means of a dicing saw with a blade for silicon use the polymer optical waveguide is cut at right angles to the longitudinal direction of the core, and a core with a mirror surface is exposed and made into as a light incident and exit part.

The propagation loss of the polymer waveguide thus obtained is 0.06 dB/cm.

Example 2

A flexible polymer optical waveguide is manufactured in the same manner as in Example 1 except insofar that a polyether ether ketone (PEEK) film is used in place of the PES film.

The propagation loss of the polymer waveguide thus obtained is 0.06 dB/cm.

Example 3

A flexible polymer optical waveguide is manufactured in the same manner as in Example 1 except insofar that an Arton film is used in place of the PES film.

The propagation loss of the polymer waveguide thus obtained is 0.06 dB/cm.

Example 4

A film-shaped polymer optical waveguide having a total thickness of 200 µm is manufactured in the same manner as in Example 1 except insofar that the PES film which is both the lower film and the upper film base material is replaced by to a 50-µm-thick PES film, and a metal spacer having a thickness of 200 µm is used.

The propagation loss of the polymer waveguide thus obtained is 0.06 dB/cm.

Example 5

A core is formed on the lower clad layer in the same manner as in Example 1 except insofar that the lower film used in Example 1 is replaced by a 100-µm-thick Arton film. Next, a clad ultraviolet ray-curable resin having a refractive index of 1.51 after being cured, identical to that of the Arton film is applied by means of a dispenser to the surface on which the core is formed. (Coating thickness is designed to be of such a thickness that when a glass plate is put on the spacer, no gap develops between the coating surface of the ultraviolet ray-curable resin and the glass plate.)

Next, a 200-µm-thick metal spacer (gap-forming member) is placed on the surface of a fixing jig and a glass plate (shape retentive member) coated with 0.2-µm-thick Saitop (fluororesin manufactured by Asahi Glass Company) is put on the spacer. 50 mW/cm$^2$ UV light is applied to the resin through the glass plate for a period of 10 minutes to cure the resin. A flexible film-shaped polymer optical waveguide having a total thickness of 200 µm is obtained.

Next, by using a dicing saw provided with a blade for Si use, the polymer optical waveguide film is cut at right angles to the longitudinal direction of the core. A core with a mirror surface is thus exposed and made into a light incident and exit part.

The propagation loss of the polymer waveguide thus obtained is 0.08 dB/cm.

What is claimed is:

1. A method of producing a polymer optical waveguide, the method comprising:

preparing a mold which is formed of a cured layer of a mold-forming curable resin, has a recess portion corresponding to a protrusion portion of a core of the optical waveguide and is provided with at least two through-holes at the recess portion;

preparing a lower film base material comprising a lower film and a flat lower clad layer disposed on the lower film;

introducing a core-forming curable resin into a first through-hole of the mold with which the lower film base material is brought into close contact, while sucking the recess portion of the mold from a second through-hole under reduced pressure to introduce the core-forming curable resin into the recess portion of the mold;

curing the core-forming curable resin which has been introduced;

removing the mold from the lower film base material;

providing a clad-forming curable resin layer and an upper film base material, the clad-forming curable resin layer being sandwiched between the lower film base material, on which the core is formed, and the upper film base material; and curing the clad-forming curable resin layer to fix the lower film base material and the upper film base material.

2. The method of claim 1, wherein the lower clad layer is formed by applying a clad-forming curable resin and then curing the resin.

3. The method of claim 1, wherein during curing of the clad-forming curable resin layer, a shape retentive member is placed on the upper film base material.

4. The method of claim 3, wherein the shape retentive member is made of a glass plate or a light-transmittable film.

5. The method of claim 3, wherein the shape retentive member has a thickness of 150 µm or more.

6. The method of claim 3, wherein the shape retentive member has a releasing layer formed thereon.

7. The method of claim 6, wherein the releasing layer comprises a fluororesin.

8. The method of claim 7, wherein the fluororesin comprises an amorphous fluororesin.

9. The method of claim 1, wherein, when the clad-forming curable resin layer is provided, a gap-forming member is used to determine a thickness of the clad-forming curable resin layer.

10. The method of claim 1, wherein the mold-forming curable resin comprises a curable polydimethylsiloxane rubber.

11. The method of claim 1, wherein a surface roughness of the mold is 100 nm or less.

12. The method of claim 1, wherein the lower film is a heat-resistant resin film.

13. The method of claim 1, wherein the lower film is a resin film with a low water absorption capacity.

14. The method of claim 1, wherein each of the core-forming curable resin and the clad-forming curable resin is ultraviolet curable.

15. The method of claim 1, wherein a difference between refractive indices of the core-forming curable resin and the clad-forming curable resin after each resin is cured is 0.01 or more.

16. The method of claim 1, wherein each of the core-forming curable resin and the clad-forming curable resin has a curing shrinkage factor of 10% or less.

17. The method of claim 1, wherein each of the core-forming curable resin and the clad-forming curable resin has a viscosity of 2,000 mPa·s or less.

18. The method of claim 1, wherein the polymer optical waveguide is a film-shaped polymer optical waveguide having a thickness of 300 μm or less.

19. A method of producing a polymer optical waveguide, the method comprising:
   preparing a mold which is formed of a cured layer of a mold-forming curable resin, has a recess portion corresponding to a protrusion portion of a core of the optical waveguide and is provided with at least two through-holes at the recess portion;
   preparing a lower film base material comprising a lower film and a flat lower clad layer disposed on the lower film;
   introducing a core-forming curable resin into a first through-hole of the mold with which the lower film base material is brought into close contact, while sucking the recess portion of the mold from a second through-hole under reduced pressure to introduce the core-forming curable resin into the recess portion of the mold;
   curing the core-forming curable resin which has been introduced;
   removing the mold from the lower film base material;
   providing a clad-forming curable resin layer and a shape retentive member having a releasing layer formed thereon, the clad-forming curable resin layer being sandwiched between the lower film base material, on which the core is formed, and the shape retentive member;
   curing the clad-forming curable resin layer; and
   removing the shape retentive member from the clad-forming curable resin layer that has been cured.

20. The method of claim 19, wherein the polymer optical waveguide is a film-shaped polymer optical waveguide having a thickness of 300 μm or less.

* * * * *